United States Patent
Aprile et al.

(10) Patent No.: US 7,860,391 B1
(45) Date of Patent: Dec. 28, 2010

(54) HIGHLY RESILIENT ARCHITECTURE FOR DWDM NETWORKS PROVIDING 1+1 OPTICAL CHANNEL PROTECTION

(75) Inventors: Aldo Aprile, Milan (IT); Massimo Cambiaghi, Villasanta (IT); Valerio Viscardi, Paderno Dugnano (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/401,131

(22) Filed: Mar. 10, 2009

Related U.S. Application Data

(63) Continuation of application No. 10/142,327, filed on May 8, 2002, now abandoned.

(51) Int. Cl.
*H04J 14/00* (2006.01)
*H04B 10/00* (2006.01)
(52) U.S. Cl. .............................. 398/1; 398/67; 398/72; 398/68; 398/3; 398/5; 398/104
(58) Field of Classification Search ................... 398/58, 398/66–68, 70–72, 104, 105, 1–5
See application file for complete search history.

(56) References Cited

U.S. PATENT DOCUMENTS

| 6,278,689 | B1 | 8/2001 | Afferton et al. | |
|---|---|---|---|---|
| 6,763,190 | B2* | 7/2004 | Agrawal et al. | 398/5 |
| 2002/0030864 | A1 | 3/2002 | Chaudhuri et al. | |
| 2003/0005095 | A1* | 1/2003 | Fee | 709/221 |
| 2003/0031433 | A1* | 2/2003 | Feinberg | 385/100 |
| 2003/0204768 | A1 | 10/2003 | Fee | |

OTHER PUBLICATIONS

Rajiv Ramaswami, et al. "Optical Networks: A Practical Perspective," 10.4, pp. 430-434, 1998.
"Network Topology," retrieved from http://en.wikipedia.org/wiki/Network topology, Aug. 8, 2006.

* cited by examiner

*Primary Examiner*—Dalzid Singh

(57) ABSTRACT

A WDM communication system that includes links traversing substantially inaccessible regions may tolerate multiple failures. In one implementation, a primary link spanning such a region is protected by a backup link. To provide further fault tolerance diverse paths may be provided to and from this backup link. The region may be, for example, an ocean.

10 Claims, 7 Drawing Sheets

HIGHLY RESILIENT ARCHITECTURE FOR DWDM NETWORKS PROVIDING 1+1 OPTICAL CHANNEL PROTECTION

This application is a continuation of U.S. patent application Ser. No. 10/142,327, filed on May 8, 2002 now abandoned, the entirety of which is incorporated herein by reference.

BACKGROUND

The present disclosure relates to optical communication systems and more particularly to systems and methods for handling failures in optical communication networks.

In order to accommodate increasing demands from Internet traffic, optical communication links are evolving to carry higher and higher data rates over greater and greater distances. Wavelength division multiplexed (WDM) links are carrying greater numbers of more densely spaced channels on the same fiber. For example, a single optical fiber may carry 160 channels, each having a data carrying capacity of 10 Gbps, making for a total available capacity of 1.6 terabits per second. Roughly speaking, this is the information equivalent of more than 19 million simultaneous phone calls.

Advances in optical amplifier technology allow such high capacity links to extend for thousands of kilometers. By traversing oceans and spanning continents with high capacity links, a broadband backbone network of global reach is being constructed.

With such a large volume of Internet traffic depending on the operational status of a single WDM link, assuring link reliability is of paramount importance. Many protection schemes have been developed to assure fault tolerance. In the dominant fault tolerance paradigm, when a link failure is detected optical signals are redirected through an alternative route that avoids the failed link. The alternative routes are pre-configured. In some cases, the optical hardware is arranged such that the same optical signal flows down a working route and a redundant protection route simultaneously with the receiver selecting the protection route upon detection of a failure. In other implementations, the protection route is traversed by the protected signal only upon a link failure and is otherwise available to carry low priority traffic that may be left unprotected.

This fault protection paradigm, often referred to as the "1+1" protection scheme, assumes that the backup link(s) will not fail before the protected primary link has been repaired. A reliability problem thus arises where links traverse a substantially inaccessible region such as a body of water. If, for example, a transoceanic link goes down due to an optical amplifier failure or a simple cable break thousands of miles from shore, repairs may require days or even weeks. If any portion of the backup link fails in the interim, the protected traffic will lose service, causing disruption and loss of revenue to the service provider.

What is needed are systems and methods for providing robust fault tolerance to optical communication links that traverse substantially inaccessible regions and therefore require tolerance to multiple failures.

SUMMARY

By virtue of one embodiment, a WDM communication system that includes links traversing substantially inaccessible regions may tolerate multiple failures. In one implementation, a primary link spanning such a region is protected by a backup link. To provide further fault tolerance diverse paths may be provided to and from this backup link. The region may be, for example, an ocean.

A first aspect of the techniques described herein provide a WDM communication system. The WDM communication system includes: a first WDM communication link connecting a first gateway node and a second gateway node, the first WDM communication link extending in part through a substantially inaccessible region, a second WDM communication link connecting a third gateway node and a fourth gateway node, the second WDM communication link extending in part through the substantially inaccessible region, a first client node in optical communication with both the first gateway node and the third gateway node, and a second client node reachable through either the second gateway node or the fourth gateway node. The first gateway node is in optical communication with the third gateway node. The first client node transmits a client signal destined for the second client node along a primary path through the first gateway node and the second gateway node. Upon a failure of the first WDM communication link, the client signal flows through the third gateway node and the second communication link. Upon the failure, redundant communication for the client signal between the first client node and the third gateway node is provided by connection between the first client node and the third gateway node and by connection through the first gateway node.

A second aspect of the techniques described herein provide a WDM communication system. The WDM communication system includes: a first WDM communication link connecting a first gateway node and a second gateway node, the first WDM communication link extending in part through a substantially inaccessible region, a second WDM communication link connecting a third gateway node and a fourth gateway node, the second WDM communication link extending in part through the substantially inaccessible region, a first client node in communication with both the first gateway node and the third gateway node, and a second client node in direct optical communication with both the second gateway node and the fourth gateway node. The second gateway node is in optical communication with the fourth gateway node. The first client node transmits a client signal destined for the second client node along a primary path through the first gateway node and the second gateway node. Upon a failure of the first WDM communication link, the client signal flows through the third gateway node and the second communication link. Upon the failure, redundant communication for the client signal between the fourth gateway node and the second client node is provided by connection between the second client node and the fourth gateway node and by connection through the second gateway node.

A third aspect of the techniques described herein provide a method of operating a WDM communication system extending through a substantially inaccessible region. The method includes: providing a first WDM communication link connecting a first gateway node and a second gateway node, the first WDM communication link extending in part through the substantially inaccessible region, providing a second WDM communication link connecting a third gateway node and a fourth gateway node, the second WDM communication link extending in part through the substantially inaccessible region, providing a first client node in optical communication with both the first gateway node and the third gateway node and a second client node in communication with both the second gateway node and the fourth gateway node, wherein the first gateway node is in optical communication with the third gateway node, transmitting from the first client node a client signal destined for the second client node along a primary path through the first gateway node and the second gateway node, and, upon a failure of the first WDM communication link, redirecting the client signal through the third gateway node and the second WDM communication link. Upon the failure, redundant communication for the client signal between the first client node and the third gateway node is provided by connection between the first client node and the third gateway node and by connection through the first gateway node.

A fourth aspect of the techniques described herein provide a method of operating a WDM communication system extending through a substantially inaccessible region. The method includes providing a first WDM communication link connecting a first gateway node and a second gateway node, the first WDM communication link extending in part through the substantially inaccessible region, providing a second WDM communication link connecting a third gateway node and a fourth gateway node, the second WDM communication link extending in part through the substantially inaccessible region, providing a first client node in communication with both the first gateway node and the third gateway node and a second client node in optical communication with both the second gateway node and the fourth gateway node, wherein the second gateway node is in optical communication with the fourth gateway node transmitting from the first client node a client signal destined for the second client node along a primary path through the first gateway node and the second gateway node, and upon a failure of the first WDM communication link, redirecting the client signal through the third gateway node and the second WDM communication link. Upon the failure, redundant communication for the client signal between the fourth gateway node and the second client node is provided by direct connection between the fourth gateway node and the second client node and by connection through the first gateway node.

Further understanding of the nature and advantages of the techniques described herein may be realized by reference to the remaining portions of the specification and the attached drawings.

Further understanding of the nature and advantages of the inventions herein may be realized by reference to the remaining portions of the specification and the attached drawings.

DESCRIPTION OF SPECIFIC EMBODIMENTS

In one embodiment, the techniques described herein are applied to an optical communication system that includes a link traversing a substantially inaccessible region. Examples of substantially inaccessible regions include bodies of waters such as oceans, lakes, etc., land areas not readily reachable by vehicle such as dense forests, tundra areas, highly mountainous areas, etc. Repair of a failure may take a very long time, during which additional system failures may occur.

The "1+1" Protection Approach

Figure 1:
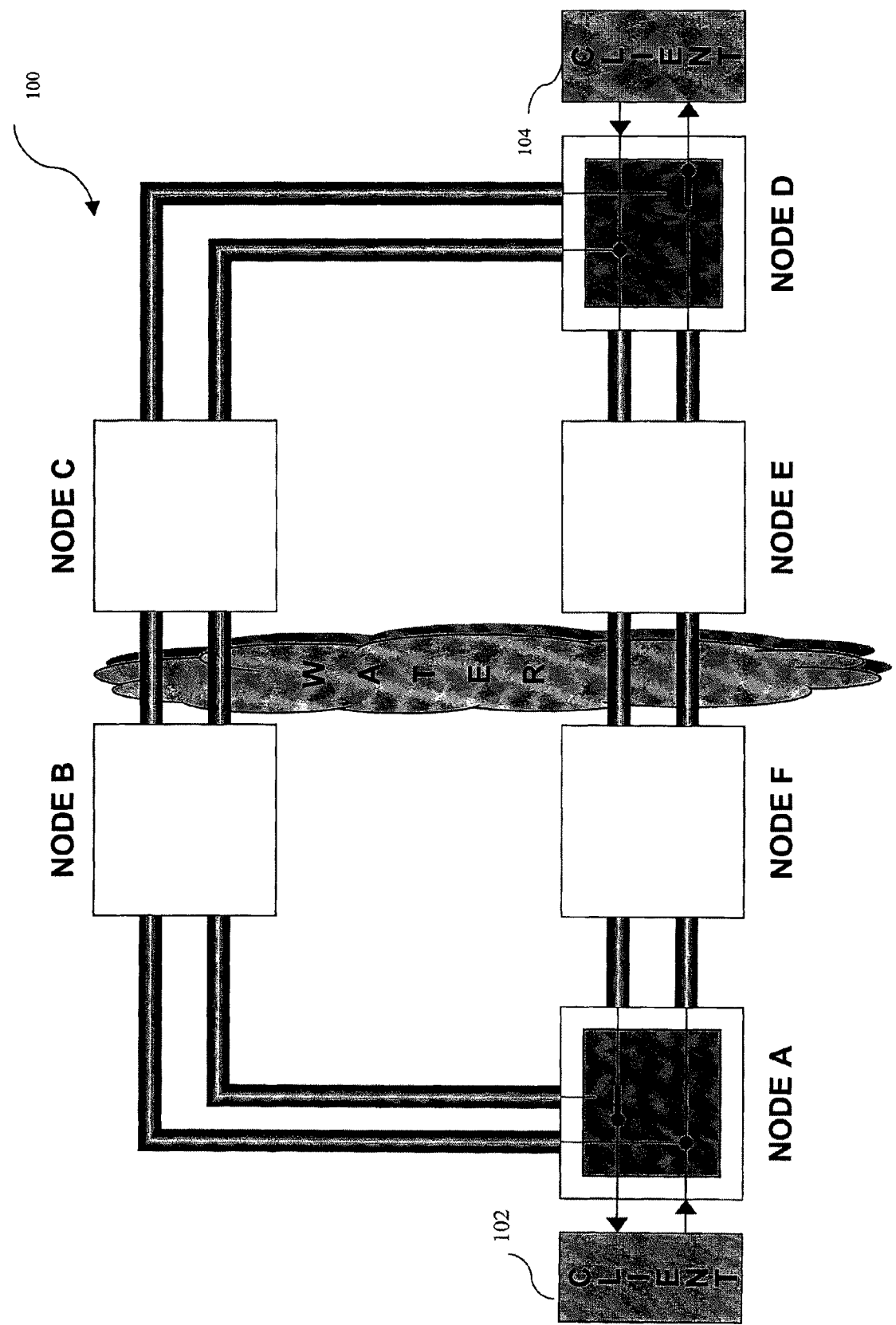
FIG. 1 depicts an optical network traversing an ocean where 1+1 protection is provided to a transoceanic link.

To place features and embodiments described herein in better context, the "1+1" approach to providing fault tolerance to a transoceanic link will now be explored. FIG. 1 depicts a WDM communication system 100 presented in simplified form. A first client 102 and a second client 104 exchange data signals via WDM communication system 100. The exchanged data signals may be, e.g., 2.5 Gbps, 10 Gbps signals, etc. The client data signals may be formatted in accordance with well-known standards such as SONET, SDH, IP, ATM, Ethernet, etc., or some combination thereof. Clients 102 and 104 each represent a data source and a data sink, typically another network.

A primary path for the exchanged data signals extends through node A (also referred to as a "client node"), node F (a "gateway node"), node E (another gateway node), and node D (another client node). The links between node F and node E traverse a substantially inaccessible region such as a body of water, desert, jungle, etc. To protect against a failure of the links between node F and node E, an alternative path is provided through node B (gateway) and node C (gateway). To provide redundancy, node A sends traffic out through links to both node B and node F and is capable of switching its source for received traffic between node F and node B. Node D operates similarly with respect to its links to node C and node E.

In a specific implementation, the various nodes A through F are DWDM systems such as the 15808 series available from Cisco Systems of San Jose, Calif. Each node is capable of transmitting and receiving numerous wavelengths, converting between electrical and optical signals as well as separating and combining wavelengths as necessary. Each client node modulates the client signal to be transmitted onto a particular wavelength and recovers the client signal from a particular received wavelength. The gateway nodes may simply pass the client wavelength through (i.e., without optical-electrical-optical regeneration) or may recover the electrical signal and use it to modulate a new optical signal on either the same wavelength or a different wavelength. The links between the various nodes may be purely optical, with or without intermediate optical amplification, or may involve intermediate regeneration of the optical signal, or even shifting among wavelengths. The switching between the primary and alternate paths may be accomplished by channel protection cards, also available from Cisco Systems, and installed at node A and node D.

Figure 2:
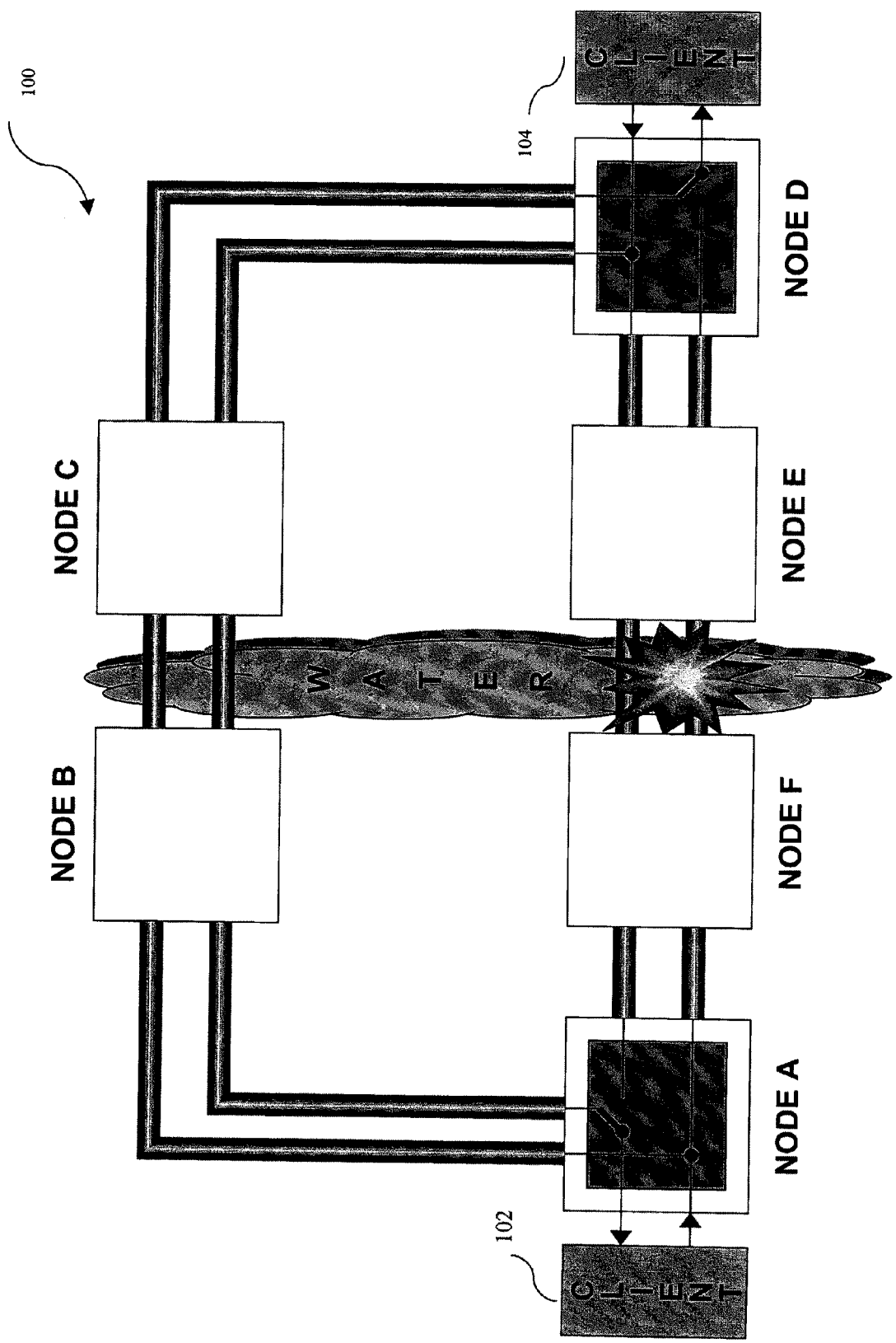
FIG. 2 depicts the operation of the network of FIG. 1 to substitute a redundant transoceanic link upon failure of a primary transoceanic link.

FIG. 2 depicts how the WDM communication system of FIG. 1 reacts to a failure between node E and node F, e.g., a fiber cut. The links between node B and node C are used as a substitute to implement 1+1 protection. Node A switches its client signal reception to node B from node F while node D switches its reception from node E to node C. This mode of operation continues until such time as the links between node F and node E can be repaired.

Figure 3:
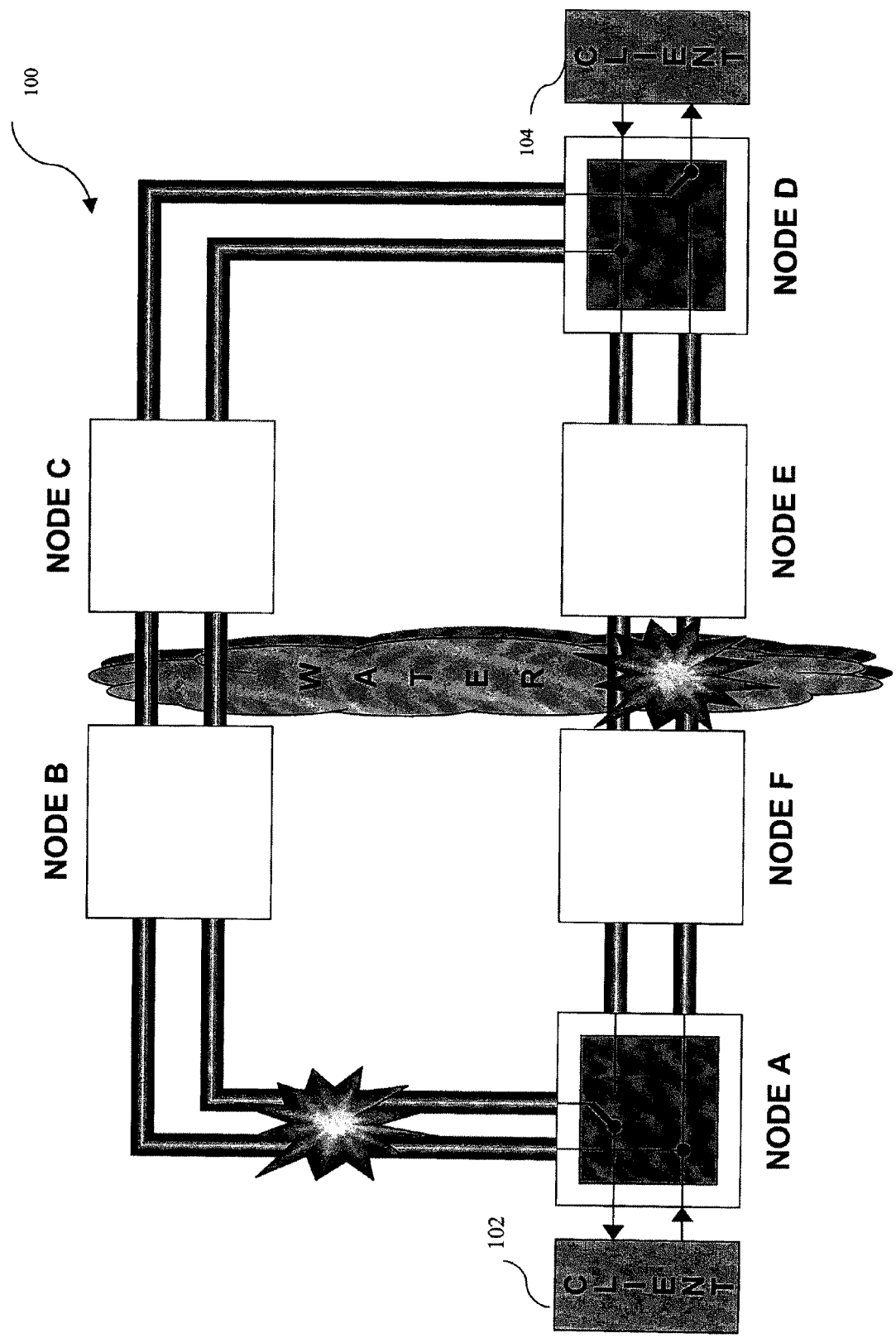
FIG. 3 depicts how the network of FIG. 1 is unable to protect against a failure in a link to the redundant transoceanic link that occurs prior to repair of the failure of the primary transoceanic link.

Unfortunately, the time to repair the failure between node F and node E may be quite long due to the inaccessibility of the fault. FIG. 3 shows a scenario where a second failure, e.g., between node A and node B, occurs prior to repair of the first failure between node F and node E. The 1+1 protection scheme is unable to provide an alternative route between the two clients 102 and 104 in response to a double failure such as this.

Resilient Architecture

Figure 4:
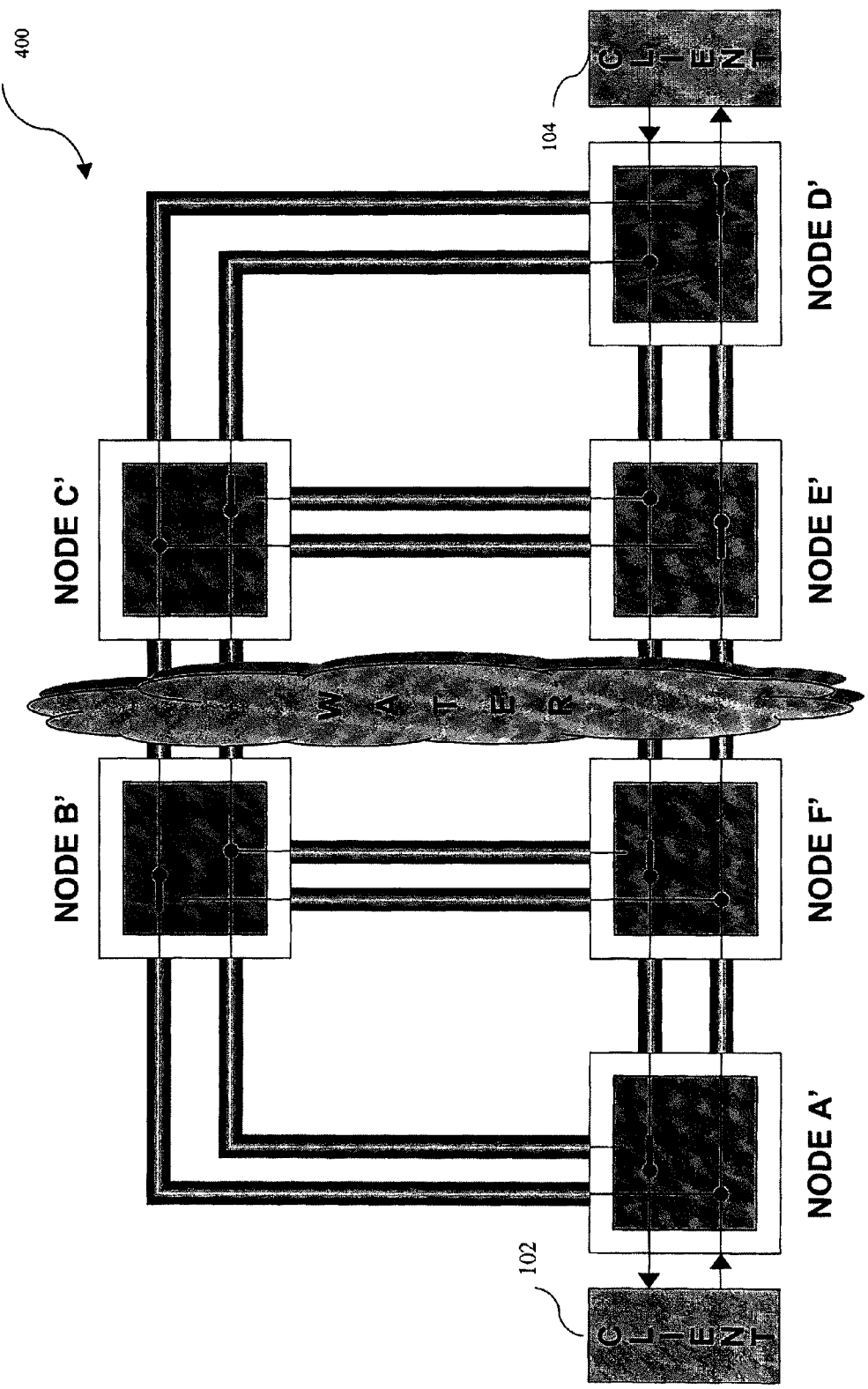
FIG. 4 depicts a resilient optical network traversing an ocean and tolerant to multiple failures according to one embodiment.

FIG. 4 shows a resilient architecture of a WDM communication system 400. Nodes A' and D' are client nodes that may be implemented similarly to nodes A and B of FIG. 1. Nodes B', C', E', and F' are similar to nodes B, C, E, and F of FIG. 1 but they are also augmented with channel protection capability. Nodes A' through F' may be implemented in any suitable manner, e.g., by using the Cisco 15808 DWDM system augmented by channel protection capability provided by e.g., the OCP channel protection card, also available from Cisco Systems. Alternatively, nodes A' through F' may be implemented using single wavelength transmitters and receivers. WDM communication system 400 is further enhanced in comparison to WDM communication system 100 by the inclusion of cross-gateway links between nodes B' and node F' on one side of the water and between nodes C' and node E' on the other side of the water.

Figure 5:
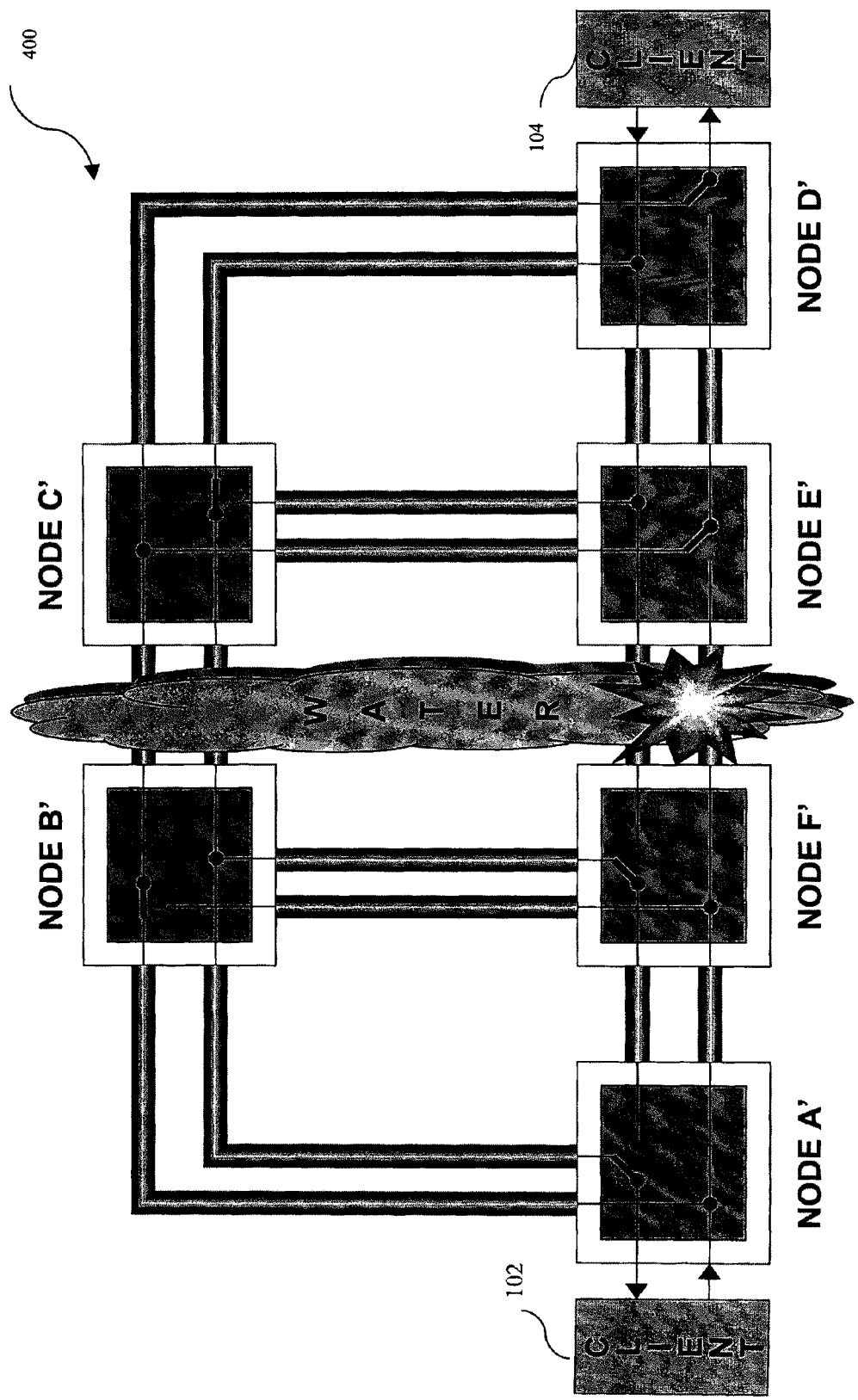
FIG. 5 depicts how the resilient network of FIG. 4 substitutes a redundant transoceanic link for a failed primary transoceanic link according to one embodiment.

The primary communication path between clients 102 and 104 is through nodes A', F', E' and D'. FIG. 5 shows the reaction of WDM communication system to a single failure. The link between node B' and node C' substitutes for the lost connection between nodes E' and F'. Node A' switches to receive the client 104 signal channel from node B' while node D' switches to receive client 102 signal channel from node C'.

Figure 6:
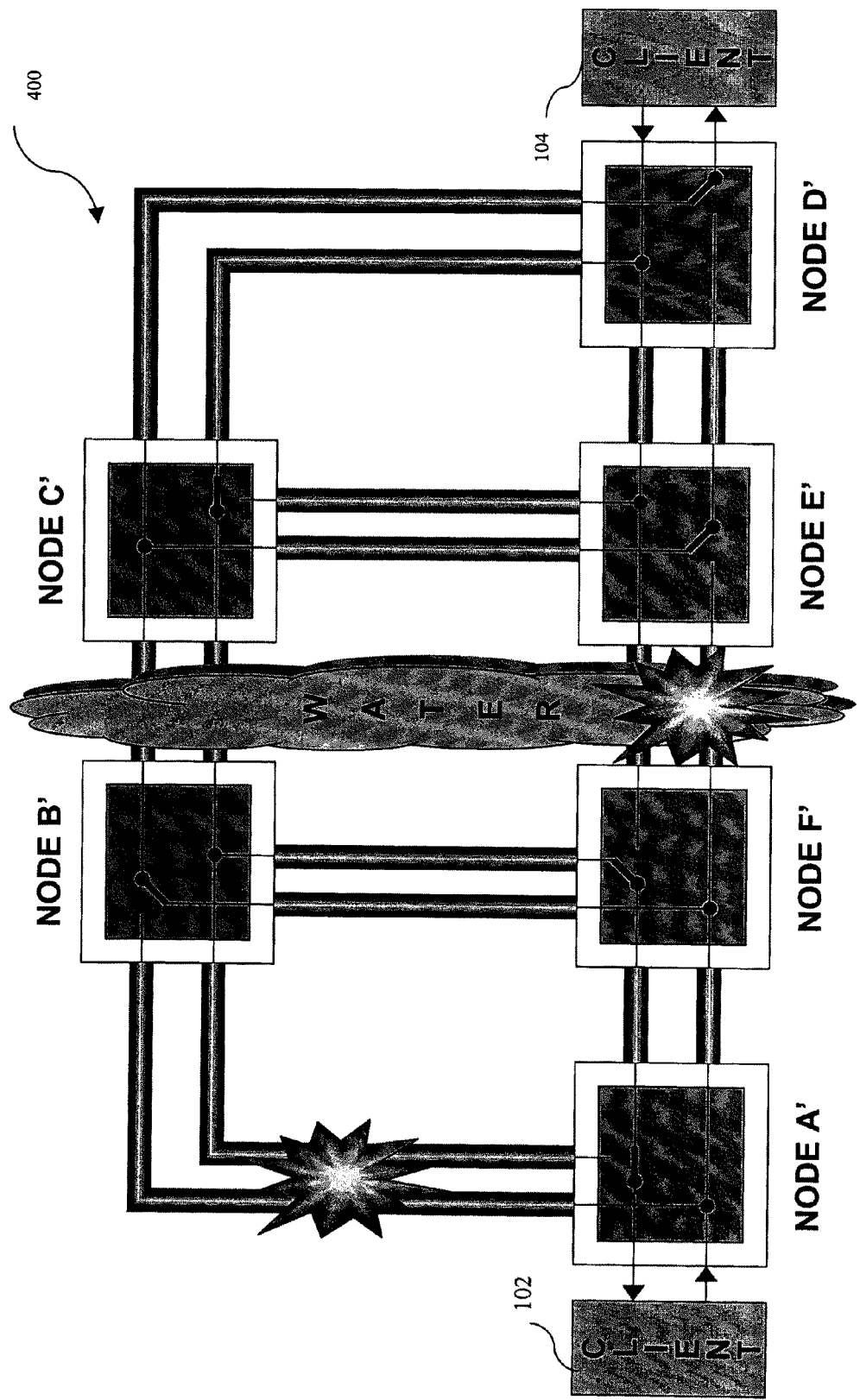
FIG. 6 depicts how the scenario of FIG. 5 may be extended to protect against an additional failure that occurs prior to the repair of the first failure according to one embodiment.

FIG. 6 shows how WDM communication system 400 is resilient to a double failure according to one embodiment. Before the connection between node F' and node E' is repaired, a second failure occurs between node B' and node A'. The new path runs through nodes A', F', B', C, and D'. The channel protection equipment at node A' sets itself for client signal reception through node F' while node F' sets itself for client signal reception from node B'. Communication between client 102 and client 104 continues successfully despite the double failure.

Figure 7:
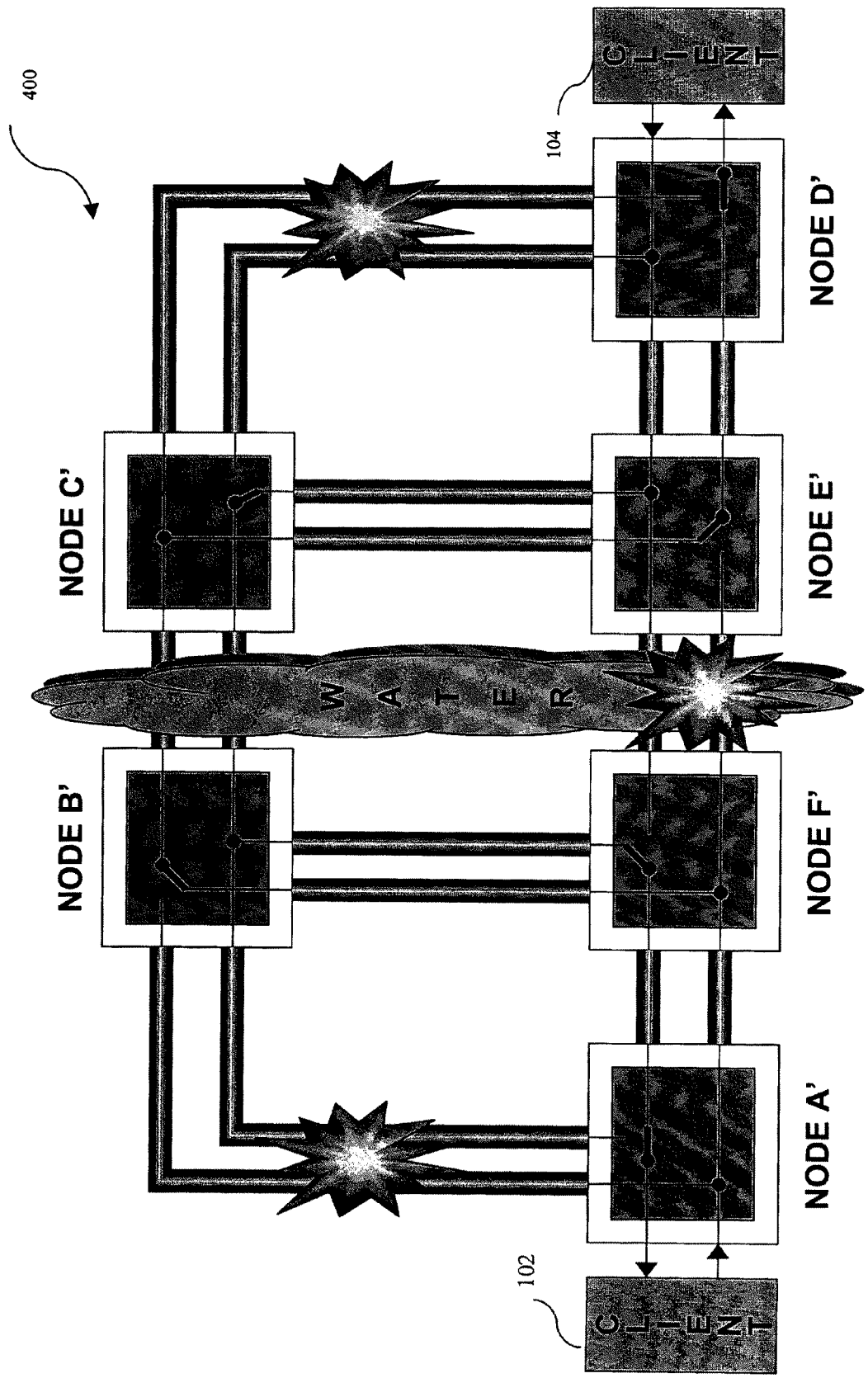
FIG. 7 depicts how the scenario of FIG. 6 may be further extended to protect against a third failure that occurs prior to the repair of the first two failures according to one embodiment.

FIG. 7 depicts how WDM communication system 400 may be resilient to even a triple failure according to one embodiment. Before repairs can be made to the connection between node A' and node B' or the connection between node F' and node E', a further failure occurs between node C and node D'. Communication system 400 adjusts and the new path between client 102 and client 104 runs through nodes, A', F', B', C, E', and D'. Node D' switches to receive client signals from node E' while node E' is set to receive client signals from node C.

A particular failure detection mechanism has not been discussed because it is not germane to the techniques provided herein. For example, the protection mechanism at each node may simply react to a loss of received signal and switch to the alternate path automatically. Also, although protection has been discussed as applying to particular channels, it may also be applied in a similar manner to the entire DWDM channel set or to particular multi-channel subbands. It is also possible to selectively provide either no protection, traditional "1+1" protection, or resilient protection selectively for individual channels or subbands.

The resilient protection architecture provided herein offers many advantages. It does not assume that only single failures will occur and that any single failure will be repaired prior to a subsequent failure. The resilient protection mechanism may be applied only to certain channels or subbands in view of Service Level Agreements in place between the service provider and individual customers. Also, the resilient architecture may be implemented with off-the-shelf DWDM equipment and channel protection units. Moreover the switching action does not require any coordination protocol such as the well-known Automatic Protection Switching (APS) protocol.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A wavelength division multiplexed (WDM) communication system comprising:

a first WDM communication link connecting a first gateway node and a second gateway node, said first WDM communication link extending in part through a substantially inaccessible region;

a second WDM communication link connecting a third gateway node and a fourth gateway node, said second WDM communication link extending in part through said substantially inaccessible region;

a fifth gateway node on a first side of said substantially inaccessible region in optical communication with the first gateway node and the third gateway node;

a sixth gateway node on a second side of said substantially inaccessible region in optical communication with the second gateway node and the fourth gateway node;

a first client node on the first side of said substantially inaccessible region in optical communication with said fifth gateway node;

a second client node on a second side of said substantially inaccessible region in optical communication with said sixth gateway node; and a first cross-gateway link between said first gateway node and said third gateway node configured to provide redundant communications on said first side of said substantially inaccessible region;

a second cross-gateway link between said second gateway node and said fourth gateway configured to provide redundant communications on said second side of said substantially inaccessible region; and wherein said first gateway node is in optical communication with said third gateway node via said first cross-gateway link and said second gateway node is in optical communication with said fourth gateway node via said second cross-gateway link;

wherein said first client node is configured to transmit a client signal destined for said second client node along a primary path from said fifth gateway node to the first gateway node and across said substantially inaccessible region along said first WDM communication link to said second gateway node and to said sixth gateway node which is configured to route said client signal to said second client node;

wherein upon a failure of said first WDM communication link, said fifth gateway node is configured to direct said client signal from the first client node through said third gateway node and across said substantially inaccessible region along said second WDM communication link to said fourth gateway node and to said sixth gateway node which is configured to route said client signal to said second client node; and wherein upon said failure, said fifth gateway node is configured to provide redundant communication for said client signal to said third gateway node by routing the client signal to said first gateway node which is in turn configured to route the client signal to said third gateway node via said first cross-gateway link.

2. The WDM communication system of claim 1, wherein said third gateway node is configured to switch a source connection for said second WDM communication link between said fifth gateway node and said first gateway node via said first cross-gateway link.

3. The WDM communication system of claim 1, wherein upon a further failure comprising a failure of communication between said fifth gateway node and said third gateway node, said fifth gateway node is configured to reroute said client signal from said first client node to said third gateway node through said first gateway node and said first cross-gateway link.

4. The WDM communication system of claim 1, wherein upon a further failure comprising a failure of communication between said fourth gateway node and said sixth gateway node, said fourth gateway node is configured to route said client signal to said second gateway node via said second cross-gateway link, said second gateway node in turn is configured to route said client signal to said sixth gateway node which is configured to route said client signal to said second client node.

5. The WDM communication system of claim 1, wherein upon said failure, said fourth gateway node is configured to route said client signal from said first client node to said second gateway node and to said sixth gateway node, and wherein said sixth gateway node is configured to receive said client signal from either the second gateway node or said fourth gateway node.

6. The WDM communication system of claim 1, wherein said sixth gateway node is configured to route a client signal from said second client node intended for said first client node to said fourth gateway node for transmission on said second WDM communication link across said substantially inaccessible region to said third gateway node, and to route said client signal from said second client node to said second gateway node for transmission on said first WDM communication link across said substantially inaccessible region to said first gateway node.

7. A method comprising:
providing a first wavelength division multiplexed (WDM) communication link connecting a first gateway node and a second gateway node, said first WDM communication link extending in part through a substantially inaccessible region;
providing a second WDM communication link connecting a third gateway node and a fourth gateway node, said second WDM communication link extending in part through said substantially inaccessible region;
on a first side of said substantially inaccessible region, routing signals from a first client node to a fifth gateway node that is in optical communication with both said first gateway node and said third gateway node;
on a second side of said substantially inaccessible region, routing signals to a second client node from a sixth gateway node that is in optical communication with both said second gateway node and said fourth gateway node;
providing an optical communication path comprising a first cross-gateway link between said first gateway node and said third gateway node on said first side of the substantially inaccessible region for redundant communications on said first side of said substantially inaccessible region;
providing an optical communication path via a second cross-gateway link between said second gateway node and said fourth gateway node on said second side of the substantially inaccessible region for redundant communications on said second side of said substantially inaccessible region;
transmitting from said first client node a client signal destined for said second client node along a primary path from said fifth gateway node through said first gateway node and across said substantially inaccessible region along said first WDM communication link to said second gateway node and to said sixth gateway node which routes said client signal to said second client node;
upon a failure of said first WDM communication link, redirecting said client signal from said fifth gateway node through said third gateway node and across said substantially inaccessible region along said second WDM communication link to said fourth gateway node and to said sixth gateway node which routes the client signal to said second client node; and
wherein upon said failure, redundantly communicating said client signal between said first client node to said third gateway node via said first cross-gateway link.

8. The method of claim 7, wherein upon failure of communication between said fifth gateway node and said third gateway node, the fifth gateway node rerouting said client signal to said third gateway node via said first gateway node and said first cross-gateway link.

9. The method of claim 7, wherein upon a further failure comprising a failure of communication between said fourth gateway node and said sixth gateway node, routing said client signal from said fourth gateway node to said second gateway node via said second cross-gateway link, and routing said client signal from said second gateway node to said sixth gateway node and to said second client node.

10. The method of claim 7, wherein upon said failure, routing said client signal from said fourth gateway node to said second gateway node via said second cross-gateway link and to said sixth gateway node, and at said sixth gateway node, routing the client signal to the second client node from either said second gateway node or said fourth gateway node.

* * * * *